United States Patent Office 2,706,875
Patented Apr. 26, 1955

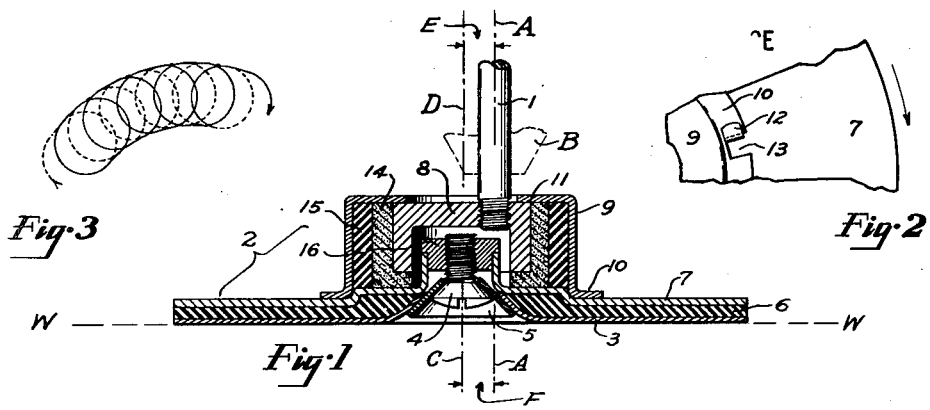

2,706,875

POWER-DRIVEN SURFACE-TREATING TOOL

Frank R. Higley, Cleveland Heights, Ohio

Application May 3, 1950, Serial No. 159,700

2 Claims. (Cl. 51—197)

This invention relates to power-driven surface-treating tools, and is particularly adapted for such tools intended to be manually applied to the work while driven by a portable electric motor, the frame of which is provided with handle means for the purpose; the surface treatment contemplated including abrasion such as sanding, either on wood or metal, or polishing or otherwise rubbing.

The device is applicable for attachment to a so-called "electric drill" as by the drill chuck thereof, in the manner indicated in Patent 1,749,709 issued March 4, 1930, to Loveland, but the device may be employed as well in connection with heavier duty portable tools such as indicated in the Patent No. 1,951,964 issued March 20, 1934, to Burleigh et al. and Patent No. Re. 21,180 of August 22, 1939, to Meyers; or the device might be incorporated as well in a bench machine wherein the work is applied to the tool, as generally exemplified in Patent 233,067 issued October 12, 1880, to Buzzell.

A principal feature of the invention resides in novel characteristics of motion of the tool head which carries the finishing face against the work, and in the method as well as the structure by which such result is had.

Briefly, as will hereinafter appear, the invention provides, by very simple, light and compact mechanism, a characteristic motion of a typical point on the surface-treating face of the tool head, responsive to bearing of the face against the work as well as to the drive applied to the shank portion of the device.

Moreover, such characteristic motion is variable dependent on whether the entire face bears against the work or only a peripheral portion thereof has such bearing.

In the former case the motion is principally of gyratory characteristic, but includes a component such that the face has progression as well as gyration, whereby the path of the typical point on the face avoids a closed circular one, and, therefore, is not repeated even though the tool shank is continuously driven without traversing advancement by the operator over the work.

Moreover, by suitable selective construction, the advancement component of motion which is superimposed upon the gyrational components, may be in either desired direction about the tool head center for either direction of drive of the shank of the device.

When only a peripheral portion of the tool head face is borne against the work, its principal component of motion is in the nature of a back-and-forth or reciprocating character but still with an advancing component superimposed thereon whereby the path is not repeated and the entire periphery of the face is nevertheless ultimately and automatically brought against the work.

In any event, according to this invention, the motion throughout the working area of the working face is approximately equal, so that wear on the working face as well as the effect of the tool on the work, is equalized.

Notably also as a further object, the above objects are accomplished by a single shank connection to the source of power, such shank serving for both drive and support, without necessitating any other structure for reaction from the tool head.

The invention includes eccentrically moving tool head parts, having eccentricity which varies with conditions of operation.

Further objects and advantages will be apparent from the following description taken in connection with the accompanying drawings which are more or less conventionalized and wherein Fig. 1 is a view in typical sectional elevation of an embodiment of the invention, including broken lines indicating elementary concepts as will hereinafter appear;

Fig. 2 is a plan view in detail of a portion thereof;

Fig. 3 indicates the character of motion of a typical point on the tool head face, produced in operation thereof.

With reference now to the drawings and first to Fig. 1 thereof; 1 is a driving and supporting shaft constituting the shank of the device, disposed on the axis A which constitutes the principal axis of the tool, and mounted to receive and transmit driven rotation thereabout as by the chuck B of an electric tool, or mounted for similar drive in any other suitable manner.

2 indicates generally a tool head, having a facing 3 of surface-treating character such as of sandpaper, the tool head with its facing being disposed symmetrically about an axis C adjacent and parallel to the axis A of the shaft 1. As is usual in the art, the facing 3 is preferably circular and the tool head includes a discuate backing therefor. At any rate the facing and its backing and the remainder of the tool proper, are disposed concentrically about the tool head axis C, which is thus central and perpendicular to the working face.

The facing 3 is demountably secured for replacement on its backing as by the usual countersunk screw 4 and dished washer 5, and its backing means includes an element 6 of synthetic rubber or the like, here indicated as bonded to a sheet metal member 7. Further details in this respect are not material to this invtntion, but it will be appreciated that the member 7 may be thin and somewhat flexible, or the member 7 may have but slight radial extent from the center, or the element 6 might be of sufficient thickness to in itself provide desired stiffness with flexibility.

According to this invention I provide crank means for both support and drive of the tool head 2 by the shaft 1 such that the tool head axis C moves about the axis A. As here shown such crank means is in the form of an eccentric 8 having an axis D and mounted directly on the crankshaft 1, so that the shaft A serves as drive complementary to the driven eccentric to provide a throw of the eccentric as indicated at E, which is slight relative to the face 3 of the tool head, and producing a stroke of the eccentric which is twice such distance E.

Further according to the invention the tool head is mounted on the eccentric 8 in such manner as to not only be supported and actuated thereby but also to have limited lateral motion relative thereto. In Fig. 1 of the drawings the eccentric and the tool head parts are shown as concentric so that their respective axes D and C coincide.

More particularly as here illustrated, the tool head includes a hub portion including a cap 9 having an outturned flange 10 and an in-turned flange 11. The flange 10 seats about a concentric annular shoulder on the member 7 of the tool head and is secured to the member 7 as by a number of peripherally spaced tabs 12 on the member 7 and cooperative notches 13 on the flange 10 in a bayonet joint arrangement.

The in-turned flange 11 overhangs the upper face of the eccentric 8 to bear peripherally thereon and clear the shaft 1.

The inner diameter of the hub member 9 is substantially greater than the outer diameter of the eccentric 8, thus providing an annular space therebetween. In this space is arranged a cylindrical bushing 14, which may be of sintered metal impregnated with lubricant, fitting about the eccentric 8 for free rotatable bearing relative thereto. Preferably also, the bushing 14 has an inturned flange at its bottom on which the lower end of the eccentric 8 may have thrust bearing, such flange having bearing on the member 7, these parts being flat at such location.

The annular space within the cap 9 about the bushing 14, contains a cylindrical bushing 15 of resiliently yieldable character such as of rubber, preferably synthetic.

The eccentric 8 is hollow as indicated with a downwardly opening central cavity within which is located a nut 16 press fitted or otherwise rigidly secured in the member 7 to receive the screw 4, while clearing the eccentric 8.

The arrangement is such, and particularly the fit of the parts at the hub portion of the tool head, that the eccentric 8 when driven by the shaft 1 may be free for rotation within the bushing 14, the bushing 15 will tend to maintain the tool head concentric with the eccentric 8 but the tool head may have lateral displacement from such concentricity, yieldably opposed by the bushing 15.

Operation will be as follows, assuming the drive shaft 1 rotating in clockwise direction as indicated by the arrow, Fig. 2, at a substantially high speed as by the chuck B, but without traversing movement from the axial line A.

When the parts are supported by the shaft 1, centrifugal force effective on the tool head will slightly increase the eccentricity thereof, against the effect of the resilient bushing 15, thus displacing the tool head axis C radially outwardly of the axis A, beyond the axis D.

When, however, the face of the tool head is brought against a work face as indicated by the line W—W, friction between tool head and work will resist displacement of the tool head across the face of the work so that such lateral lost motion as is permitted by the resilient bushing 15, will be effective radially inwardly of the axis A, and the path of the tool head axis C will be on a shorter radius than is that of the eccentric axis D.

The effect on the tool head is that of a driving force from the eccentric 8 against the tool head hub portion continuously generally radial from but always eccentric of the axis C, which force has continuous high-speed progression about the axis C, although delivered by the eccentric D. The resistance of the work to motion of the tool head is effectively concentrated at the axis C, and the lost motion progresses around the axes C and D in frequency with the revolutions of the shaft 1.

Consequently, the path of movement of a point on the face 3 upon the work will have such character as indicated in Fig. 3, with high-speed gyratory components on radii determined by the distance F between the axes A and C but with relatively slow component of progression, clockwise, about the axis A.

Where resilient means such as the element 15 is employed to yieldably oppose the lost motion, it is notable that in operation of the tool, the primary gyratory or stroking components of motion will automatically decrease in extent as friction of the tool head face on the work increases, and the effective leverage of the drive shaft upon the tool head will correspondingly increase, so that there is an inherent governing effect, responsive both to the pressure of the tool against the work, the nature of the tool head facing employed, and the character of the work itself. These advantages represent an aditional important object of the invention.

What I claim is:

1. The method of operating a tool head disposed about a center, with a face bearing against the work for surface treatment thereof, comprising driving said tool head to cause cyclic movement of said center about an axis thereadjacent, while permitting movement of said tool head about said center and varying the eccentricity of said center from said axis automatically responsive to the amount of friction of said bearing face against the work, and independent of movement of said axis crosswise of said work.

2. In a surface treating tool, a disk having a surface treating face, said disk having a concentric hub member, driving means for said disk having an eccentrically operating member, one of said members being disposed about the other, and means for mounting said hub member upon said eccentrically operating member and for drive of said hub member thereby, and including bearing means between said members providing for relative rotation therebetween and annular resilient means located between said members whereby limited lateral displacement between said members occurs in response to increased friction between the surface-treating face and the work.

References Cited in the file of this patent

UNITED STATES PATENTS

| | | |
|---|---|---|
| 560,797 | Hoffman | May 26, 1896 |
| 1,037,851 | Beam | Sept. 10, 1912 |
| 1,142,570 | LaHodny | June 8, 1915 |
| 1,375,129 | Carrie | Apr. 19, 1921 |
| 1,490,156 | Bugbee | Apr. 15, 1924 |
| 1,951,964 | Burleigh et al. | Mar. 20, 1934 |
| 2,234,109 | Culpepper | Mar. 14, 1941 |
| 2,290,533 | Campbell | July 21, 1942 |